United States Patent
Boling et al.

(10) Patent No.: US 8,452,673 B2
(45) Date of Patent: May 28, 2013

(54) SYSTEM FOR PROCESSING DATA ACQUIRED FROM VEHICLE DIAGNOSTIC INTERFACE FOR VEHICLE INVENTORY MONITORING

(75) Inventors: Brian M. Boling, Knoxville, TN (US); Ezra Timothy Peachey, San Diego, CA (US); James A. Giammarco, Warren, OH (US)

(73) Assignee: Procon, Inc., Knoxville, TN (US)

( * ) Notice: Subject to any disclaimer, the term of this patent is extended or adjusted under 35 U.S.C. 154(b) by 401 days.

(21) Appl. No.: 12/849,538

(22) Filed: Aug. 3, 2010

(65) Prior Publication Data
US 2011/0093159 A1    Apr. 21, 2011

Related U.S. Application Data

(60) Provisional application No. 61/253,209, filed on Oct. 20, 2009.

(51) Int. Cl.
*G06Q 40/00* (2006.01)

(52) U.S. Cl.
USPC .................. 705/28; 705/38; 701/24

(58) Field of Classification Search
CPC .................................................... G06Q 40/00
See application file for complete search history.

(56) References Cited

U.S. PATENT DOCUMENTS

| | | |
|---|---|---|
| 6,564,127 B1 | 5/2003 | Bauerle et al. |
| 6,594,579 B1 | 7/2003 | Lowrey et al. |
| 6,604,033 B1 | 8/2003 | Banet et al. |
| 6,611,740 B2 | 8/2003 | Lowrey et al. |
| 6,636,790 B1 | 10/2003 | Lightner et al. |
| 6,732,031 B1 | 5/2004 | Lowrey et al. |
| 6,832,140 B2 | 12/2004 | Fan et al. |
| 6,836,708 B2 | 12/2004 | Tripathi |
| 6,957,133 B1 | 10/2005 | Hunt et al. |
| 7,113,127 B1 | 9/2006 | Banet et al. |
| 7,149,206 B2 | 12/2006 | Pruzan et al. |
| 7,480,551 B1 | 1/2009 | Lowrey et al. |
| 7,532,962 B1 | 5/2009 | Lowrey et al. |
| 7,532,963 B1 | 5/2009 | Lowrey et al. |
| 2005/0177492 A1* | 8/2005 | Camping ........................ 705/38 |
| 2008/0121690 A1* | 5/2008 | Carani et al. .................. 235/376 |

* cited by examiner

*Primary Examiner* — Luna Champagne
(74) *Attorney, Agent, or Firm* — Luedeka Neely Group, P.C.

(57) ABSTRACT

A system for keeping an inventory of vehicles that serve as collateral for loans provided by a lending entity includes a vehicle monitoring device, a database, and a central vehicle data server. The vehicle monitoring device includes a wireless modem, a processor, a GPS receiver, a vehicle diagnostics interface connector, and memory. These components are preferably enclosed in a small housing which may be installed beneath the dashboard of a vehicle. The vehicle diagnostics interface connector connects to the vehicle's OBD interface which is electrically connected to the vehicle's on-board diagnostics processor. The device retrieves vehicle diagnostic data through the vehicle's OBD interface based on the occurrence of certain events during the operation of the vehicle, such as ignition events, voltage change events, and location-based events, such as crossing a geofence boundary or exceeding a mileage or speed threshold. The device transmits the retrieved vehicle diagnostic data to the central vehicle data server via a wireless communication network. Vehicle inventories are managed in the database based on the information transmitted from the vehicle monitoring device.

17 Claims, 9 Drawing Sheets

SYSTEM FOR PROCESSING DATA ACQUIRED FROM VEHICLE DIAGNOSTIC INTERFACE FOR VEHICLE INVENTORY MONITORING

This application claims priority to provisional patent application No. 61/253,209, filed Oct. 20, 2009, titled "Transmission of Vehicle Data Acquired on Event-Driven Basis From Vehicle Diagnostic Interface."

FIELD

This invention relates to monitoring vehicle data. More particularly, this invention relates to a system for accessing vehicle data through a vehicle diagnostics data bus, transmitting the vehicle data to a central data server, and monitoring inventories of vehicles for vehicle financing entities based on the vehicle data.

BACKGROUND

Most modern vehicles, including passenger cars, trucks and tractor-trailers, include an on-board vehicle diagnostics computer that monitors various vehicle systems, such as the engine, drive train and electrical components. Most vehicles include a connector through which vehicle diagnostic data may be accessed, such as by a repair technician using a vehicle diagnostics data reader. These connectors are generally referred to as on-board diagnostics (OBD) connectors. Communication protocols have been developed to standardize the access of data through the OBD connectors. For example, OBD-II is a standard that specifies a physical configuration for a diagnostic connector and the connector's pin-out, as well as electrical signaling protocols and messaging format.

Systems have been developed for connecting to a vehicle's OBD connector, accessing data from the OBD interface on a periodic basis, and transmitting the data to a central location for analysis on a periodic basis. However, these systems have not addressed the need for accessing data through a vehicle's OBD connector for monitoring inventories of vehicles, such as for vehicle financing entities.

SUMMARY OF THE INVENTION

The above and other needs are met by a system for keeping an inventory of vehicles that serve as collateral for loans provided by a lending entity. In a preferred embodiment, vehicle information is stored in a database in association with a lending entity identifier. The vehicle information preferably includes vehicle identification numbers (VINs) that uniquely identify particular vehicles for which the lending entity has provided financing. The lending entity identifier uniquely identifies the lending entity that provided the loans for the vehicles. Unique identification numbers (UINs), which uniquely identify particular vehicle monitoring devices assigned to the lending entity, are also stored in the database in association with the lending entity identifier.

The system includes a vehicle monitoring device that is connected to an on-board diagnostics connector in a vehicle. The vehicle monitoring device is capable of accessing vehicle data through the on-board diagnostics connector, determining vehicle location data indicating a location of the vehicle, and wirelessly transmitting the vehicle data and vehicle location data. A UIN is stored in the vehicle monitoring device which uniquely identifies the vehicle monitoring device. The vehicle monitoring device accesses vehicle data through the on-board diagnostics connector. This vehicle data includes at least the VIN of the vehicle in which the vehicle monitoring device is connected. The vehicle monitoring device also determines the vehicle location data, and wirelessly transmits at least the VIN of the vehicle, the vehicle location data, and the UIN of the vehicle monitoring device to a communication network.

A central vehicle data server, which is connected to the communication network and is in communication with the database, receives the VIN of the vehicle, the vehicle location data, and the UIN of the vehicle monitoring device. The central vehicle data server determines whether the VIN and UIN transmitted from the vehicle monitoring device are both associated with one and the same lending entity identifier in the database.

In some embodiments, the system provides for storing dealer location data in the database. The dealer location data indicates a dealer location at which a dealer is to sell vehicles for which loans have been provided by the lending entity identified by the lending entity identifier. Based on the vehicle location data and the dealer location data, a determination is made whether the vehicle in which the vehicle monitoring device is connected is within a predefined proximity of the dealer location.

If the VIN and the UIN transmitted from the vehicle monitoring device are not both associated with one and the same lending entity identifier in the database, or if the vehicle is not within the predefined proximity of the dealer location, an exception message is sent to the lending entity whose lending entity identifier is associated with the UIN transmitted from the vehicle monitoring device.

If the vehicle is within a predefined proximity of the dealer location, and if the VIN and UIN transmitted from the vehicle monitoring device are both associated with one and the same lending entity identifier in the database, the UIN transmitted from the vehicle monitoring device becomes associated in the database with the VIN transmitted from the vehicle monitoring device. In some embodiments, the UIN is then removed from an inactive device account in the database as part of the device registration process. As described in more detail hereinafter, the device then continues monitoring vehicle data and the vehicle location and transmitting data to the central vehicle data server when certain events occur and when periodic check-in transmissions are due.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
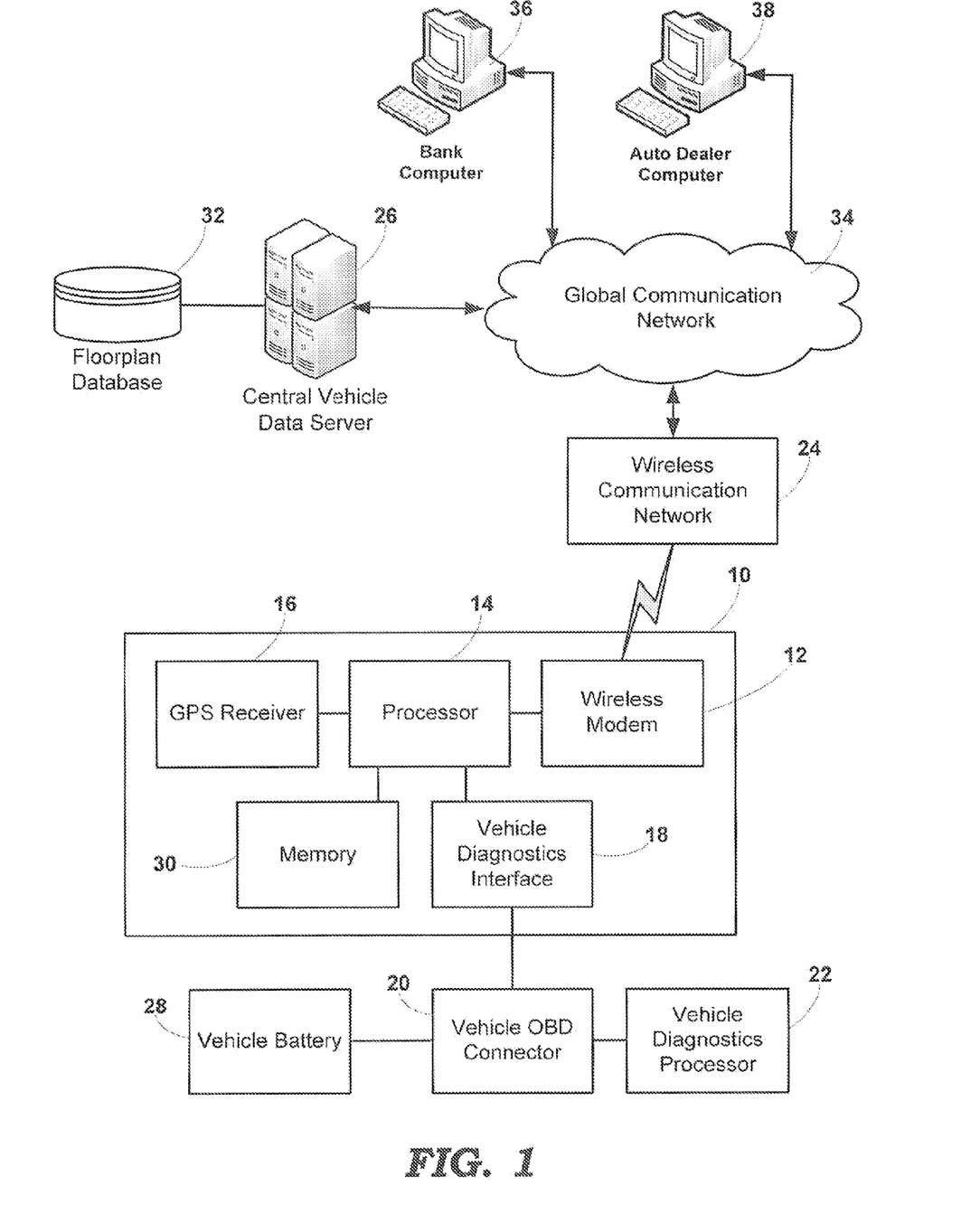
FIG. 1 depicts a functional block diagram of a system for accessing, transmitting, and processing vehicle data according to a preferred embodiment.

As shown in FIG. 1, a vehicle monitoring device 10 includes a wireless modem 12, a processor 14, a Global Positioning System (GPS) receiver 16, a vehicle diagnostics interface connector 18, and memory 30. In a preferred embodiment, all of these components of the device 10 are enclosed in a small housing which may be installed in an out-of-the-way location beneath the dashboard of a vehicle. The connector 18 of the device 10 connects to the vehicle's OBD interface connector 20 which is electrically connected to the vehicle's on-board diagnostics processor 22.

In a preferred embodiment, the connector 18 complies with the OBD-II standard (Society of Automotive Engineers (SAE) J1962) and the firmware executed by the processor 14 supports all standard OBD communication protocols, including J1850 (PWM and VPW), ISO-9141-2, ISO-14230 (KWP2000), and ISO-15765 (CAN). However, it will be appreciated that "OBD" generally refers to any and all on-board diagnostics standards for communicating vehicle diagnostic data. OBD may also refer to vehicle diagnostic connectors provided in tractor-trailer vehicles and motorized industrial vehicles and implements, such as bulldozers, cranes, forklifts, etc. Thus, reference to OBD in the current application is not limited to any particular type of interface connector or communication protocol or standard.

In a preferred embodiment, the wireless modem 12 is a radio-frequency transceiver operable to communicate in a wireless communication network 24 according to the General Packet Radio Service (GPRS) protocol and supports several communication protocols, including Short Message Service (SMS), Transmission Control Protocol (TCP), User Datagram Protocol (UDP), and File Transfer Protocol (FTP). The modem 12 preferably provides for over-the-air firmware upgrades using the FTP protocol. In some embodiments, the modem 12 is compatible with other cellular communication protocols, such as GSM and CDMA. Although cellular wireless communication is used in preferred embodiments, the invention is not limited to any particular communication technology. Any wireless communication technique may be incorporated, such as satellite communication networks, wireless local area networks, wireless wide area networks, or combinations of these or other wireless networks with wired or fiber-optic communication networks.

The wireless communication network 24 is interfaced with a global communication network 34, such as the Internet. Using the wireless modem 12, the device 10 is capable of communicating vehicle diagnostic data and vehicle location data through the wireless communication network 24 and the global communication network 34 to a central vehicle data server 26. In some embodiments, the central vehicle data server 26 comprises multiple collocated server computers. In other embodiments, the central vehicle data server 26 comprises multiple server computers distributed anywhere within the network 34 (i.e., cloud computing).

As shown in FIG. 1, a banking entity computer 36 and an auto dealer computer 38 are also connected to the global communication network 34 through which they can communicate with the central vehicle data server 26. The banking entity computer 36 may be physically located in an office of a bank, credit union, or other lending institution that provides financing for vehicle purchases. The auto dealer computer 38 may be physically located in an office of an automobile seller, such as a new and/or used auto dealer. Although only one exemplary banking entity computer 36 and auto dealer computer 38 are depicted in FIG. 1, it should be appreciated that many such computers may be connected to the network 34 and operable to communicate with the vehicle data server 26 at any one time.

In preferred embodiments, vehicle location information is obtained using the GPS receiver 16. However, one skilled in the art will appreciate that other wireless location determination systems may be used in the device 10. In some embodiments, the device 10 does not include an integrated location determination unit. In these embodiments, location information may be obtained over the OBD interface from an OEM GPS unit or other location determination unit that is installed in the vehicle. Alternatively, location information may not be used at all.

As shown in FIG. 1, the device 10 preferably receives power from the battery 28 of the vehicle in which it is installed through the OBD interface connector 18. Through this connection to the vehicle battery, the processor 14 may monitor the battery voltage. As discussed below, changes in the battery voltage are events which may trigger retrieval of data through the OBD connector 18. In alternative embodiments, the device 10 may also receive power from an internal backup battery.

In a preferred embodiment of the invention, when the device 10 is initially plugged into an OBD connector of a vehicle and the device 10 begins receiving power from the vehicle battery 28, the processor 14 accesses the vehicle identification number (VIN) through the OBD connector 20. The processor 14 also accesses a unique identification number (UIN) assigned to the device 10 from the device memory 30 or an electronic identification number (EIN) assigned to the wireless modem 12 from memory in the wireless modem 12 or from a SIM card in the modem 12. The VIN and the UIN (or EIN) are then combined in a message which is transmitted from the wireless modem 12 via the wireless network 24 to the central vehicle data server 26. The message may also include location coordinates of the vehicle acquired from the GPS receiver and data received from the vehicle diagnostics processor 22. Once the message is transmitted, the device 10 preferably goes into a standby mode waiting for the next event that will cause it to wakeup and transmit vehicle information.

The central vehicle data server 26 may use the VIN and UIN (or EIN) transmitted from the device 10 in a vehicle inventory process. For example, a vehicle finance company, such as a bank or credit union, may have a device 10 installed in every vehicle which serves as collateral for a loan to purchase the vehicle. When the central vehicle data server 26 receives a message transmitted from the device 10, the VIN and EIN are stored in a database 32 in association with the make/model/year of the vehicle and the identity of the dealership that received financing for the vehicle. The database 32 is also referred to herein as a floorplan database. From this point forward, the VIN of the vehicle and the EIN of the device 10 are linked together in the database 32. When the device 10 is moved from one vehicle to another, the sequence is repeated and the device 10 becomes automatically associated with the new vehicle in the vehicle database 32. At the same time, historical data for the previous vehicle may be archived in the vehicle database 32. In this manner, the device 10 may be easily reassigned to another vehicle within the same dealership or reused in another dealership.

Events other than the initial installation may also cause the device 10 to access information from the OBD connector 20 and/or the GPS receiver and transmit the information to the central vehicle data server 26. For example, a geofence threshold value and a mileage threshold value may be programmed into the memory 30 of the device 10. The geofence threshold may be set to a boundary around the dealership location in which the vehicle should stay during test drives or refueling trips. Once a vehicle ignition event has been detected, either through the OBD or based on battery voltage, the processor 14 may cause the GPS receiver 16 to determine location coordinates at some time interval, such as every five minutes. The processor 14 then compares the location coordinates to the dealership geofence boundary, and if the coordinates indicate the vehicle has traveled beyond the dealership geofence boundary, the processor 14 causes the wireless modem 12 to transmit an alert message containing the EIN of the device 10 along with the GPS location information. This alert message may also include other vehicle data acquired through the OBD connector 20.

Based on the alert message, the central vehicle data server 26 generates a corresponding alert message to be sent to the finance entity that provided the loan for the vehicle. The finance entity may wish to use this information to take action accordingly, such as to contact the dealership and inquire about the status of the vehicle. The mileage threshold may be used in a similar manner to generate alert messages when the total mileage traveled by the vehicle over some period, such as a week, exceeds a reasonable number.

In an embodiment of the invention, when a device 10 is assigned to a particular dealership, the central vehicle data server 26 automatically assigns the appropriate geofence boundary for that dealership.

Following is a list of exemplary events and triggers which may cause the device 10 to retrieve data through the OBD connector 20 and/or transmit retrieved data via the wireless network 24:

Battery voltage and battery voltage changes, ripple frequency and amplitude;
Driver actions, such as use of brakes, ignition switches, door switches, seatbelt use switches, steering, transmission, ventilation, air conditioning, entertainment and sound systems, turn signals, lights, and windows;
Alarm systems and door lock/unlock;
Levels and activity from vibration sensors, accelerometers, shock sensors, crash detectors, and weight detector;
Temperature changes and temperature levels of exterior or interior air, and of vehicle fluids or vehicle components;
Pressure changes in air or vehicle fluids;
Sound levels, frequencies, and changes therein, both externally and internally;
Light levels and changes therein;
Humidity levels and changes therein;
GPS acquisition and GPS data, such as location, distance traveled, speed, heading, and altitude;
Presence/absence and signal strength of nearby RFID devices;
Detection of electromagnetic interference (EMI) and electrostatic voltages;
Cellular system events, such as signal acquisition and loss, signal levels and changes, cell handoff, carrier identification, and data session characteristics including acquisition and session termination; and
Manual operation of installed switches or voice recognition.

In preferred embodiments, all data acquired through the OBD connector is acquired on an event-driven basis only. In some embodiments, data is also acquired through the OBD connector based on a time interval, such as every twelve hours.

Figure 2A:
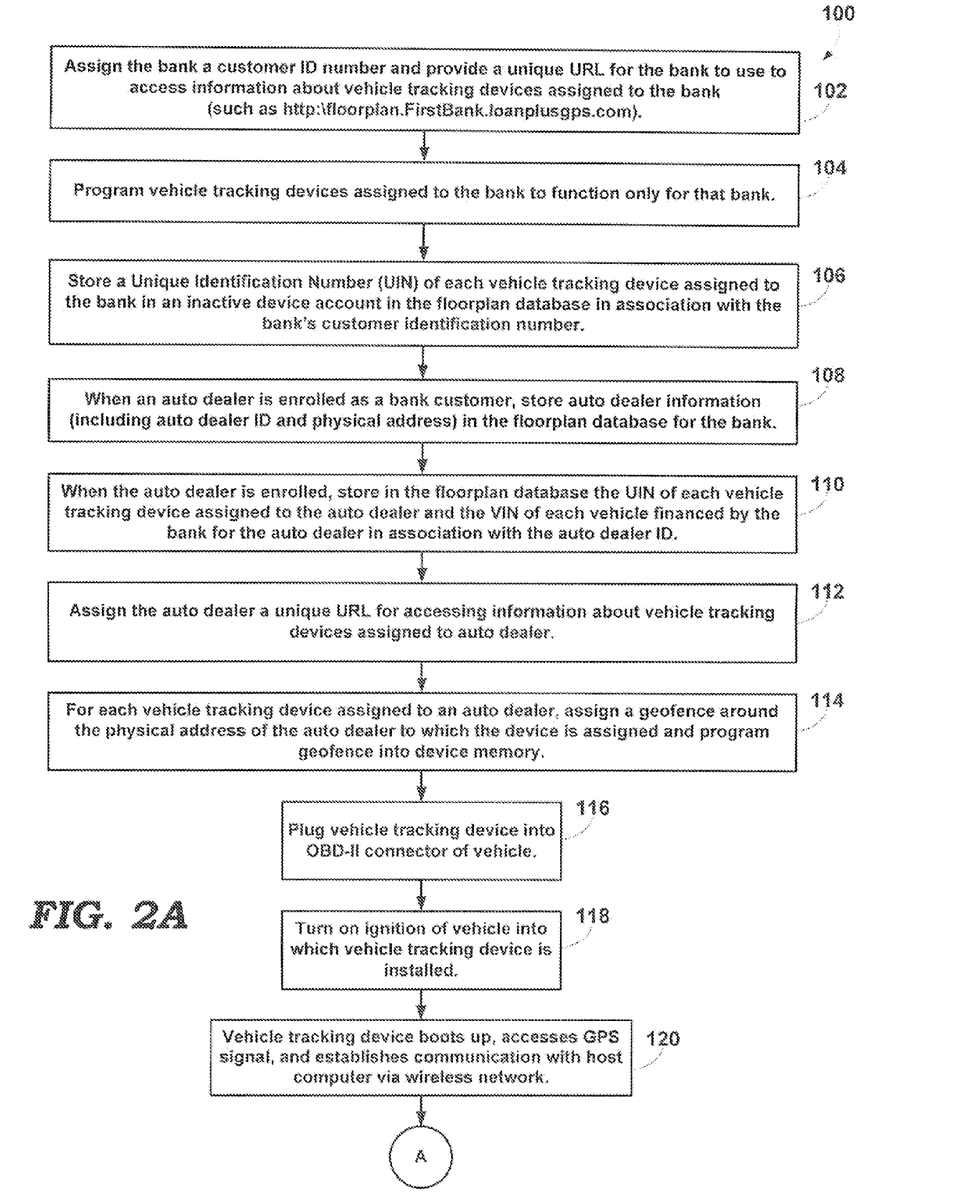
FIGS. 2A and 2B depict a functional flow diagram of a method for processing vehicle data to monitor inventories of vehicles for vehicle financing entities according to a preferred embodiment.
Figure 2B:
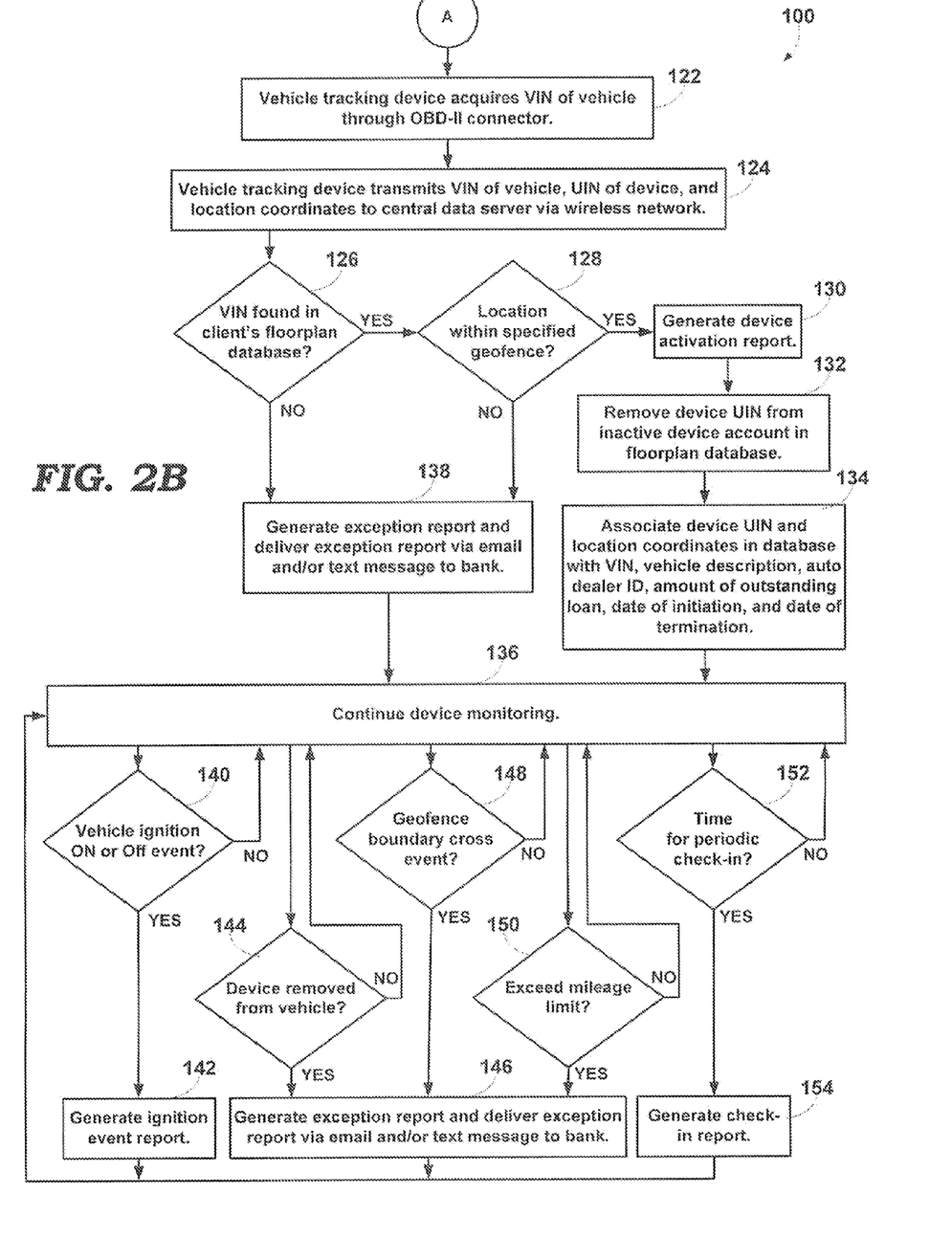

FIGS. 2A and 2B depict steps of an exemplary process 100 for accessing vehicle data and processing the vehicle data to monitor inventories of vehicles for vehicle financing entities. In this example, a vehicle financing institution is referred to as a "bank." However, it will be appreciated that the vehicle financing institution may be other than a bank, such as a credit union or an automotive financing institution associated with a vehicle manufacturer, such as GMAC. Also in this example, the entity that sells a vehicle to a consumer is referred to herein as the "auto dealer." It will be appreciated that auto dealers may include OEM automotive dealerships offering new and used cars, or dealerships that exclusively offer used cars, such as "buy-here-pay-here" car dealerships.

Figure 3A:
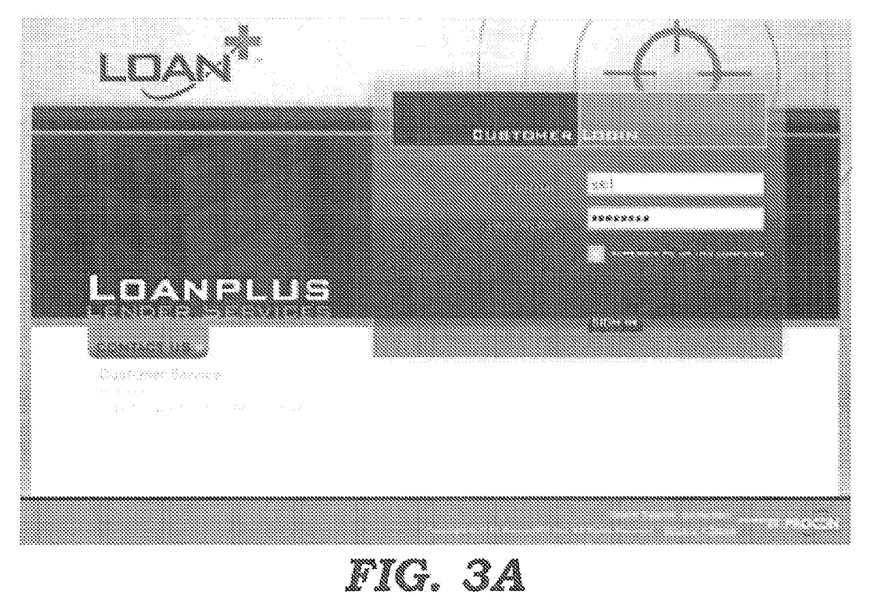
FIGS. 3A-3J depict web pages for reporting vehicle data to vehicle financing entities according to a preferred embodiment.
Figure 3B:
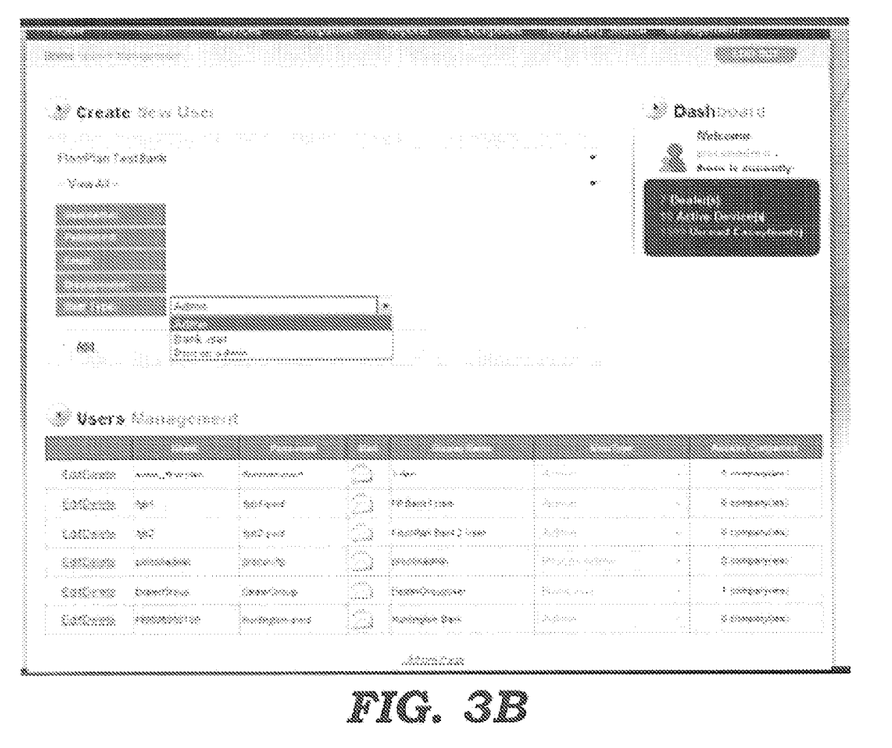

With reference to FIG. 2A, when a bank subscribes to the vehicle tracking and inventory services described herein, the bank is assigned a customer identification number and a uniform resource locator (URL) for a secure webpage on which the bank may access information regarding vehicle tracking devices assigned to the bank (step 102 in FIG. 2A). FIG. 3A depicts an example of a user login webpage accessible at a bank's assigned URL, such as http://floorplan.yourbankloanplusgps.com, as it may appear on a display of the banking entity computer 36. A user's login protocol determines which of the bank's web pages may be accessed by the particular user, and that access is determined by settings available to an account administrator for the bank. An example of an administrative page which may be used by the account administrator to control user access authority levels is depicted in FIG. 3B.

Preferably, the vehicle tracking devices assigned to a bank are programmed to provide information accessible only to the bank to which they are assigned (step 104). The UIN (or EIN) of each vehicle tracking device assigned to the bank is initially stored in an inactive device account in the floorplan database 32 in association with the bank's customer identification number (step 106). When a vehicle tracking device is activated as described in more detail below, the UIN (or EIN) for the device is removed from the inactive device account.

With reference again to FIG. 2A, when an auto dealer is enrolled as a bank customer to receive financing for vehicles on the dealer's lot, the auto dealer is assigned an auto dealer identification number associated with the bank's customer ID number in the floorplan database 32 (step 108). Also stored in the floorplan database 32 in association with the auto dealer ID number is certain auto dealer information, including the physical address of the location where vehicles will be kept prior to purchase, the UIN (or EIN) of each vehicle tracking device assigned by the bank to the auto dealer, and the make/model/year and VIN of each vehicle for which the bank is providing financing for the auto dealer (step 110). The auto dealer is also assigned a uniform resource locator (URL) for a secure webpage on which the auto dealer may access information from vehicle tracking devices assigned by the bank to the auto dealer (step 112).

Figure 3C:
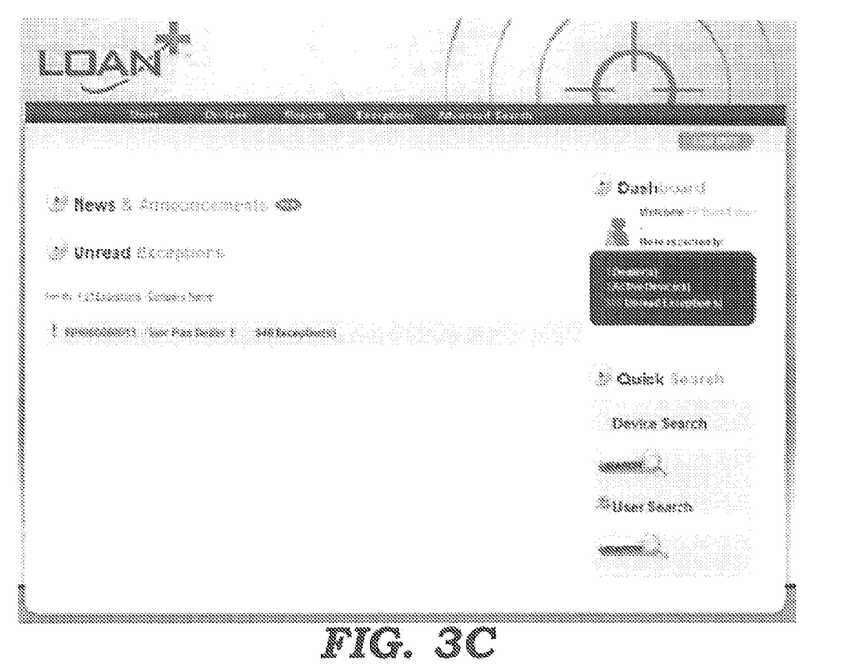
Figure 3D:
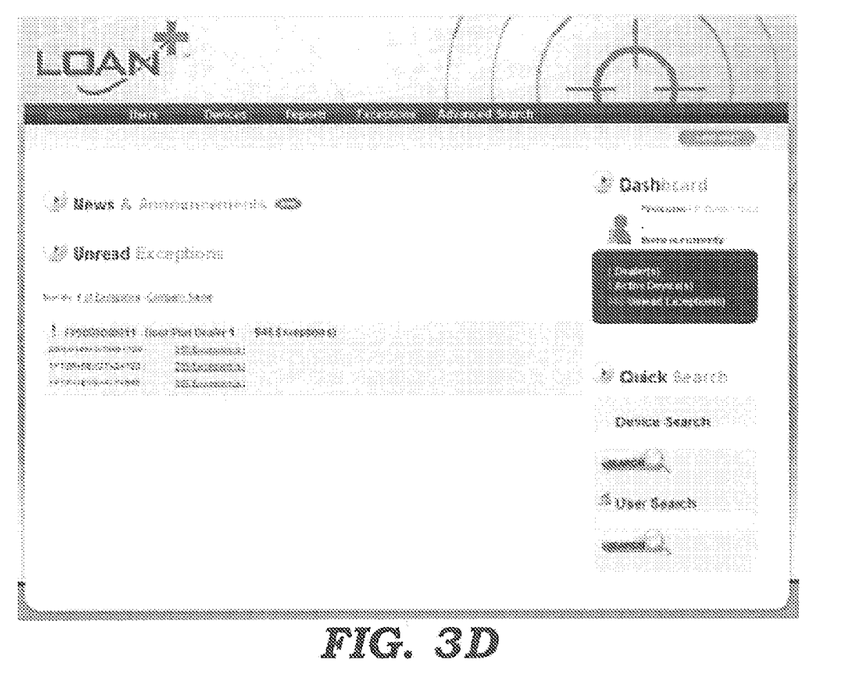
Figure 3E:
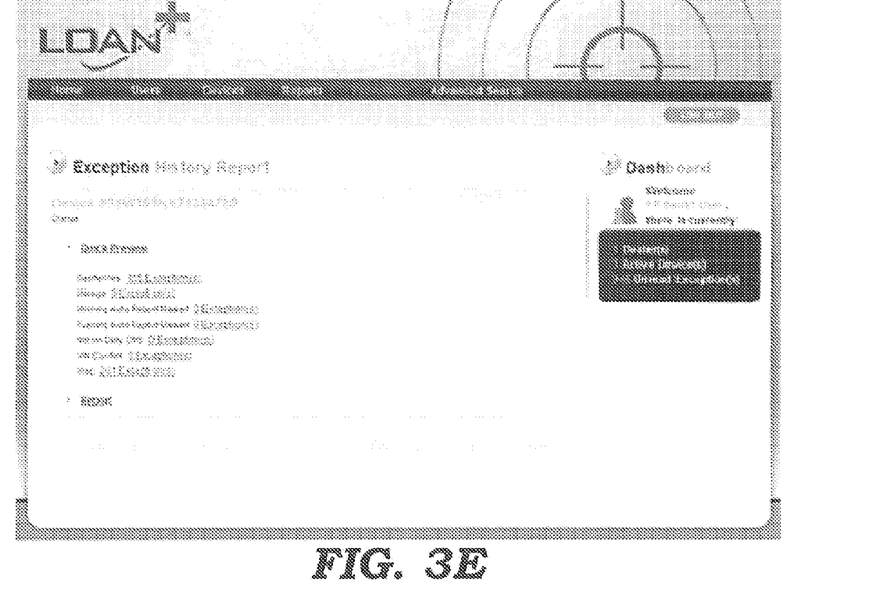

FIG. 3C depicts a bank's "home page" on which is provided a summary listing of all auto dealers enrolled in a bank's monitoring program. In this example, one dealer having a customer ID number of FP0000000011 is listed, and a total of 946 exceptions (as described below) have been reported for vehicles of this dealer. FIG. 3D depicts a webpage wherein the number of exceptions for each vehicle are cross-referenced to the UIN of the tracking device 10 in the vehicle. FIG. 3E depicts a more detailed exception history report, where the exceptions for a particular vehicle are broken down based on the types of exceptions. In this example, the vehicle has had 155 "geofence" exceptions, 0 "mileage" exceptions, 0 "morning auto report missed" exceptions, 0 "evening auto report missed" exceptions, 0 "not on daily CMS" exceptions, 0 "VIN conflict" exceptions, and 201 "miscellaneous" exceptions. Each of these types of exceptions are explained in further detail hereinafter.

A "geofence" is assigned to the auto dealer to define a boundary around the physical address of the location where vehicles are kept prior to purchase. For example, a geofence may be a circle having a radius of five miles centered at the physical address of the auto dealer's lot (step 114 in FIG. 2A). The radius of this geofence is preferably stored in the floorplan database 32 in association with the auto dealer's ID number and may also be stored in the memory 30 in each of the vehicle tracking devices 10 assigned to the auto dealer. In preferred embodiments, a mileage limit for each vehicle is also assigned and stored in the database 32 and/or in the memory 30 of the device 10.

In a preferred embodiment, the vehicle tracking device 10 is activated at the auto dealer's lot by plugging it into an OBD-II connector in a vehicle (step 116) and turning on the ignition of the vehicle (step 118). The vehicle tracking device 10 then begins executing its firmware to access signals from GPS satellites to determine location coordinates, and establish communications with the central vehicle data server 26 via the wireless communication network 24 and the Internet 34 (step 120). Upon activation, the vehicle tracking device 10 accesses the vehicle's VIN from the vehicle's diagnostic computer system through the OBD-II connector (step 122 in FIG. 2B). The device 10 then transmits the VIN of the vehicle, the UIN (or EIN) of the device, and the GPS location coordinates to the central vehicle data server 26 via the wireless communication network 24 and the Internet 34 (step 124).

Based on the initial information transmitted from the vehicle tracking device 10, the central vehicle data server 26 executes software instructions to register the device and begin monitoring the device for vehicle inventory purposes. The central vehicle data server 26 first determines whether the VIN transmitted from the device 10 is found in the floorplan database 32 in association with the auto dealer's ID number (step 126). If so, the central vehicle data server 26 then determines whether the reported location coordinates of the vehicle are within the geofence boundary for the particular auto dealer (step 128). If so, a device activation report is generated and stored in the floorplan database 32 (step 130), and the UIN (or EIN) of the tracking device 10 is removed from the inactive device account (step 132). The UIN (or EIN) of the activated device 10 is then associated with the vehicle's VIN in the floorplan database 32 along with the auto dealer's ID number, the vehicle description (make/model/year), the amount of the outstanding loan for the vehicle, the date of initiation of the loan, and the date of termination of the loan (step 134). After activation, device monitoring proceeds as described in more detail below (step 136).

If the VIN transmitted from the vehicle is not found in the floorplan database 32 in association with the auto dealer's ID number (step 126) or the reported location coordinates of the vehicle are not within the geofence boundary for the particular auto dealer (step 128), the central vehicle data server 26 generates an exception report and delivers the exception report via email or text message or both to the bank. In some embodiments, the exception report is also sent via email and/or text message to the auto dealer. Device monitoring then proceeds as described in more detail below (step 136).

In a preferred embodiment, data is provided from the vehicle tracking device 10 to indicate the status of the vehicle in which the device 10 is installed, and the central vehicle data server 26 uses the data to keep inventory records in the floorplan database 32 for the bank and for the auto dealers (step 136). The device 10 may transmit data based on the occurrence of a detected event or based on the passage of a time interval.

As shown in FIG. 2B, when the device 10 detects that the vehicle ignition has been turned OFF or ON (step 140), the device 10 transmits data to the central vehicle data server 26. The ignition event data may include but is not limited to an ignition event flag, the vehicle's VIN, the device UIN (or EIN), and the location coordinates. Upon receipt of the ignition event data from the device 10, the central vehicle data server 26 generates an ignition event report that is stored in the floorplan database 32 (step 142). For this purpose, the device 10 may monitor the 12VDC power pin on the OBD-II connector, or it may monitor ignition data transferred through the OBD-II connector from the vehicle's diagnostic processor 22.

When the vehicle data server 26 determines that the device 10 has been disconnected from the OBD-II connector (step 144), the server 26 generates a disconnection exception report and delivers the exception report via email and/or text message to an account associated with the bank and/or the auto dealer (step 146). In one embodiment, the server 26 determines that the device 10 has been disconnected from the OBD-II connector if the device 10 fails to make a regularly scheduled check-in transmission. In another embodiment, the device 10 includes an internal battery which can power the device 10 for a short time after the device 10 is unplugged from the vehicle OBD-II connector. In this embodiment, upon disconnection from the OBD-II connector, the device 10 uses the internal battery power to transmit its UIN, date/time, and location data to the central data server 26. Since this transmission lacks a VIN, the server 26 interprets this as a disconnection exception alert, and the central vehicle data server 26 generates a disconnection exception report.

If a device 10 is disconnected but no "return to inventory" process is performed as described below, and if the device 10 is subsequently plugged into a vehicle's OBD-II connector, an exception report is generated showing an "activation" event. In this case, the reported VIN is compared to the VIN previously associated with the device 10 in the database 32. If the newly reported VIN does not match the stored VIN, that change is recorded in the database 32. If the two VIN's are the same, the event is recorded and the mileage is set back to zero for that vehicle.

When the device 10 detects that the vehicle has crossed the geofence boundary stored in the device memory (step 148), the device 10 transmits data to the central vehicle data server 26 indicating a geofence crossing event. The geofence crossing event data may include but is not limited to a geofence crossing event flag, the vehicle's VIN, the device UIN (or EIN), and the location coordinates. Upon receipt of the geofence crossing event data from the device 10, the central vehicle data server 26 generates an exception report and delivers the exception report via email and/or text message to the bank and/or the auto dealer (step 146). Alternatively, the determination that the vehicle is outside a geofence boundary may be made based on location coordinate data transmitted from the device 10 during a regularly scheduled check-in transmission.

Figure 3F:
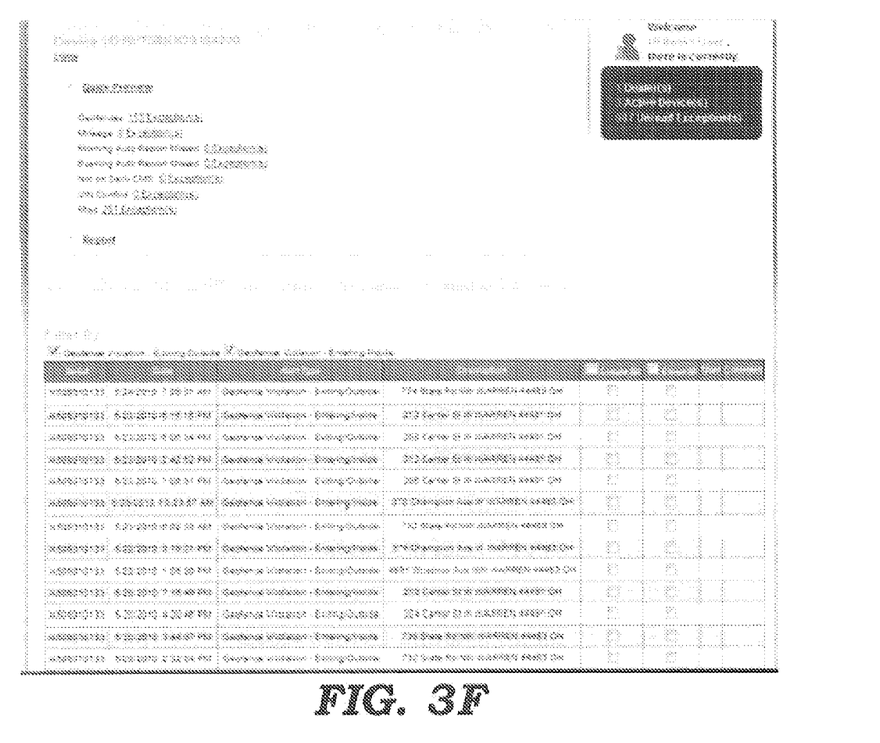

FIG. 3F depicts a geofence exception report webpage for a particular vehicle. As shown, each geofence exception is reported with the UIN of the tracking device, the date/time of the geofence violation, the type of geofence violation (entering or exiting the geofence area), and the location at which the exception occurred. A user can also log comments on this page, although no comments have been entered in the example of FIG. 3F.

As shown in FIG. 2B, when the device 10 detects that the vehicle has exceeded the mileage limit stored in the device memory (step 150), the device 10 transmits data to the central vehicle data server 26 indicating an excessive mileage event. The excessive mileage event data may include but is not limited to an excessive mileage event flag, the vehicle's VIN, the device UIN (or EIN), and the location coordinates. Upon receipt of the excessive mileage data from the device 10, the central vehicle data server 26 generates an exception report and delivers the exception report via email and/or text message to the bank and/or the auto dealer (step 146). Alternatively, the determination that the vehicle has exceeded a mileage threshold may be made by the central vehicle data server 26 based on mileage data accessed through the OBD-II connector and transmitted from the device 10 during a regularly scheduled check-in transmission. In a preferred embodiment, mileage is measured beginning at zero when the device 10 is activated for a particular vehicle, and is reset to zero when the device 10 is activated for a different vehicle.

In some preferred embodiments, the device 10 is programmed to periodically "wake up" and transmit data, such as at 12 hour intervals (step 152)(morning and evening reports). The data provided in these periodic check-in transmissions may include but is not limited to the vehicle's VIN, the device UIN (or EIN), and the location coordinates. Upon receipt of the periodic check-in data from the device 10, the central vehicle data server 26 generates a check-in report that is stored in the floorplan database 32 (step 142).

It should be appreciated that the event detection steps described above provide examples of events which may cause transmission of messages from the device 10 and generation of event reports. Data related to other events, such as those listed previously, may also be monitored for this purpose. Thus, the invention is not limited to any particular event or trigger for transmitting vehicle data and generating event reports.

Figure 3G:
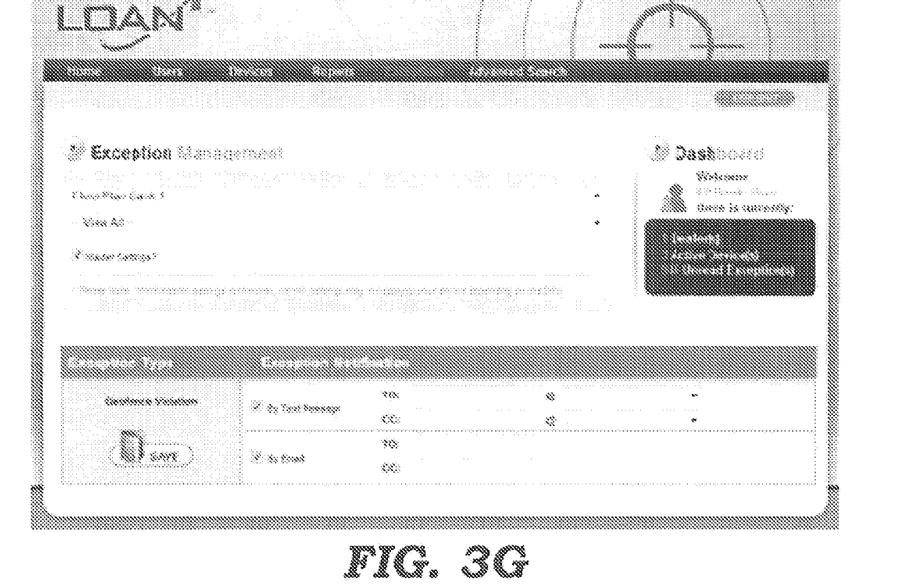
Figure 3H:
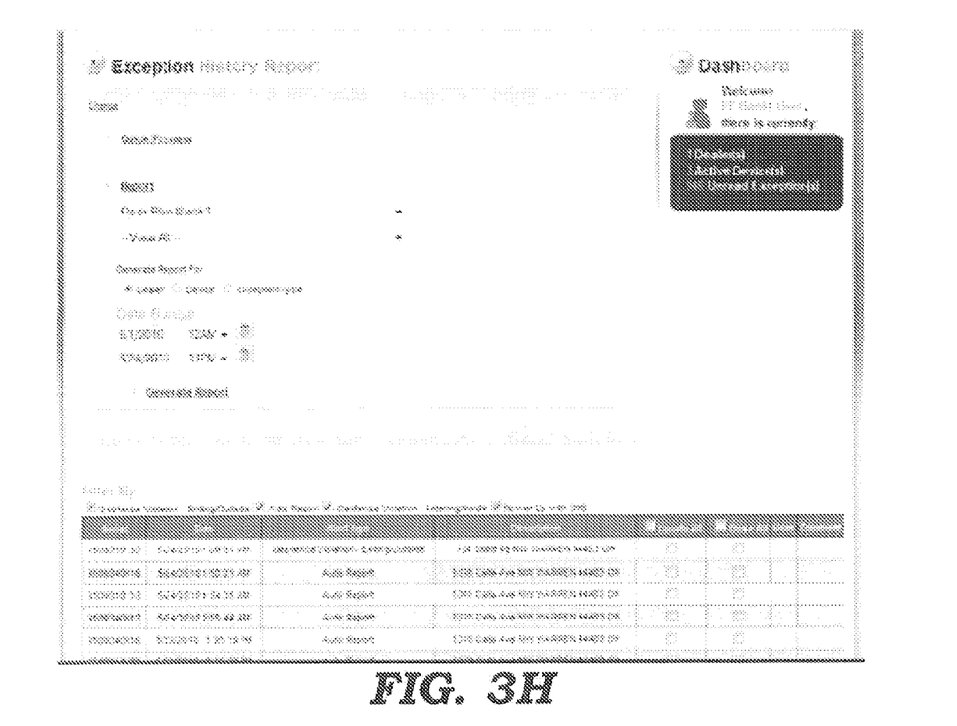

FIG. 3G depicts an exception management webpage which may be accessed by a bank user having administrator access. This page allows the user to set up email and/or text message communication of exception notifications The webpage shown in FIG. 3H allows a user to run exception reports on all vehicles or any one vehicle over a selected date range. In a preferred embodiment, this report can be generated by dealer, by device, or by exception type.

Figure 3I:
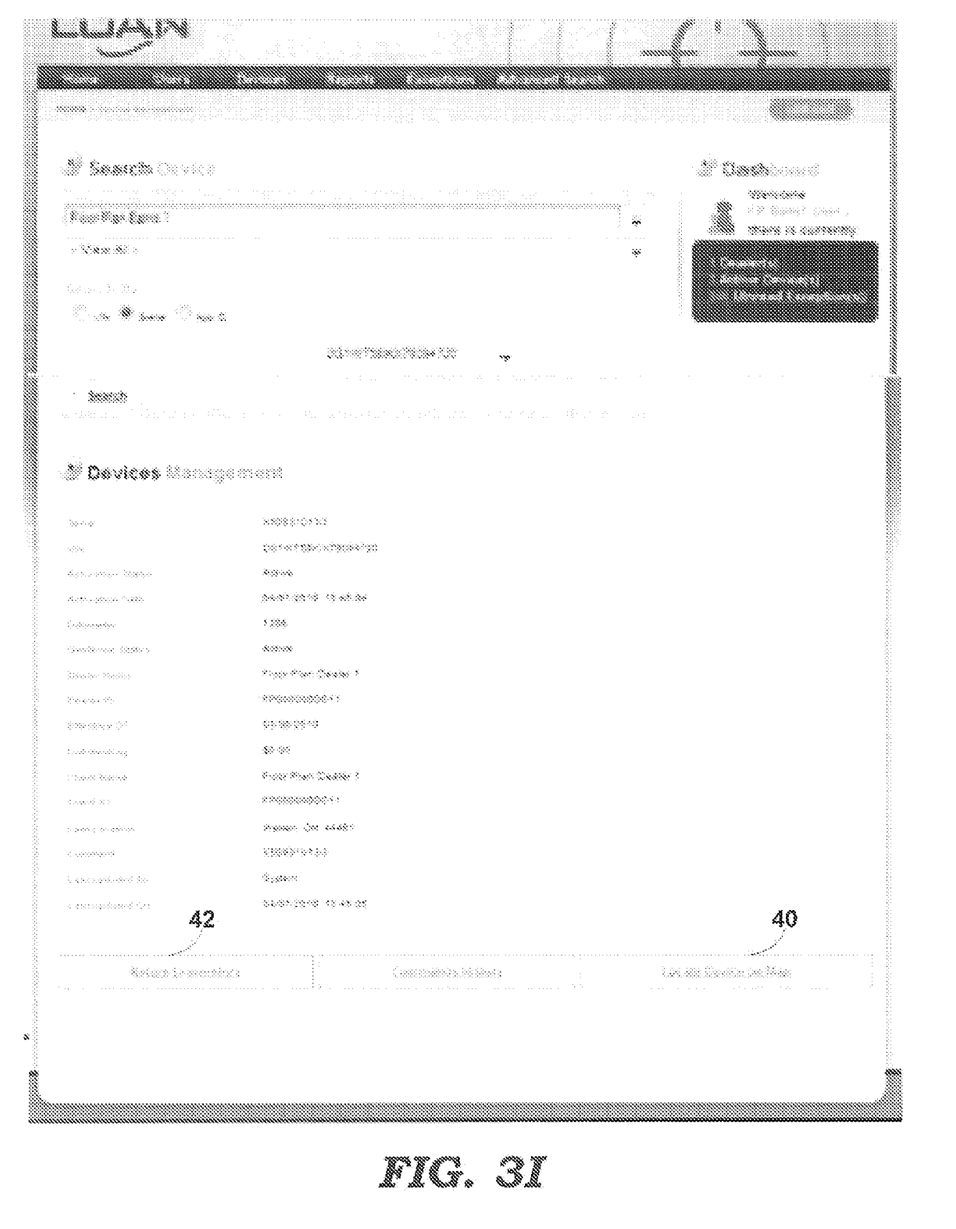
Figure 3J:
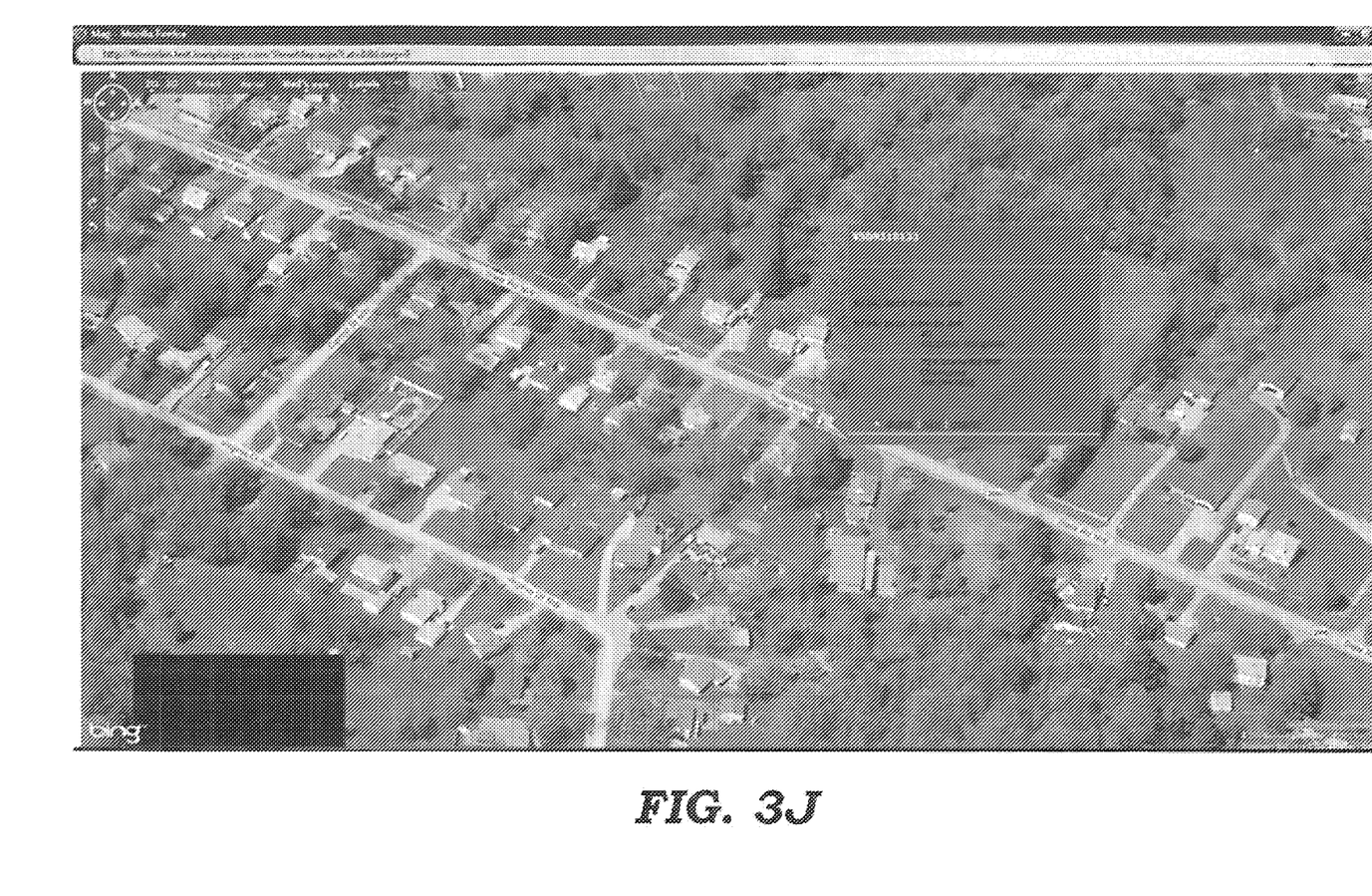

The webpage depicted in FIG. 3I reports accumulated data derived from onsite device activation (power-up), access to the floorplan database 32, and stored information about the geofence of the enrolled dealer. In a preferred embodiment, this data includes the UIN of the tracking device, the VIN of the vehicle, the tracking device activation status (active or inactive), the tracking device activation date, the vehicle odometer reading (cumulative mileage since activation of the tracking device), the geofence status (active or inactive), the dealer name, the dealer ID number, the dealer's enrollment date, the outstanding loan balance for the vehicle, the bank name, the bank ID number, the most recently reported location (address) of the vehicle, and information about how and when the data was updated. If a user clicks on the "Locate Device on Map" button 40 at the bottom right, the real-time location of the vehicle is displayed on a map or photograph image. FIG. 3J depicts an example of a display of real-time location of a vehicle based on GPS coordinate data transmitted from the tracking device 10. In this embodiment, the location is indicated by an icon placed on an overhead perspective photograph.

When a vehicle tracking device 10 is no longer needed in a vehicle, such as when a loan balance has been completely paid or when the vehicle has been severely devalued due to a wreck or other occurrence, the device 10 may be removed from the vehicle and used for tracking another vehicle for inventory purposes or placed in storage for a time. In this circumstance, a user clicks on the "Return to inventory" button 42 in the Device Management Page shown in FIG. 3I which causes the UIN of the device to be added to the inactive device account in the floorplan database 32. The device 10 may then be installed in another vehicle and the process depicted in FIGS. 2A and 2B begins again at step 116.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for keeping an inventory of vehicles that serve as collateral for loans provided by a lending entity, the method comprising:

storing vehicle information in a database in association with lending entity identifiers, wherein the vehicle information includes vehicle identification numbers (VINs) that uniquely identify particular vehicles for which the lending entities have entity has provided financing, and wherein the lending entity identifiers uniquely identify identifies the lending entities entity that provided the loans for the vehicles;

storing unique identification numbers (UINs) in the database in association with the lending entity identifier for each lending entity, wherein the unique identification numbers uniquely identify particular vehicle monitoring devices assigned to each of the lending entities entity;

connecting a first vehicle monitoring device to an on-board diagnostics connector in a vehicle, the first vehicle monitoring device having a first UIN that uniquely identifies the first vehicle monitoring device;

the first vehicle monitoring device accessing vehicle data through the on-board diagnostics connector, which vehicle data indicate at least the a first VIN of the vehicle in which the first vehicle monitoring device is connected;

the first vehicle monitoring device determining vehicle location data indicative of a location of the vehicle;

the first vehicle monitoring device wirelessly transmitting at least the first VIN of the vehicle, the vehicle location data, and the first UIN of the vehicle monitoring device to a communication network;

receiving the first VIN of the vehicle, the vehicle location data, and the first UIN of the vehicle monitoring device at a central vehicle data server that is connected to the communication network and is in communication with the database;

determining whether the first VIN and the first UIN transmitted from the vehicle monitoring device are both associated with one and the same lending entity identifier in the database; and (i) upon determining that the first VIN and the first UIN transmitted from the vehicle monitoring device are not both associated with one and the same lending entity identifier in the database, sending an exception message to the one or both of a lending entity whose lending entity identifier is associated with the first UIN transmitted from the vehicle monitoring device or to the and a lending entity whose lending entity identifier is associated with the first VIN transmitted from the vehicle monitoring device.

2. The method of claim 1 further comprising: step (a) comprising storing wherein the vehicle information stored in the database which includes dealer location data indicating a dealer location at which a dealer is to sell vehicles for which loans have been provided by the a lending entity identified by the a lending entity identifier, and the method further comprises
  (i) determining based on the vehicle location data and the dealer location data whether the vehicle in which the first vehicle monitoring device is connected is within a predefined proximity of the dealer location.

3. The method of claim 2 further comprising sending an exception message to the a lending entity whose lending entity identifier is associated with the first UIN transmitted from the vehicle monitoring device if it is determined that the vehicle in which the first vehicle monitoring device is connected is not within a predefined proximity of the dealer location.

4. The method of claim 2 further comprising storing information in the database indicating that the first vehicle monitoring device identified by the first UIN is connected to the vehicle identified by the first VIN associating the UIN transmitted from the vehicle monitoring device with the VIN transmitted from the vehicle monitoring device in the database if it is determined that the vehicle in which the first vehicle monitoring device is connected is within a predefined proximity of the dealer location, and it is also determined that the first VIN and the first UIN transmitted from the vehicle monitoring device are both associated with one and the same lending entity identifier in the database.

5. The method of claim 4 further comprising associating the first UIN transmitted from the vehicle monitoring device with the dealer location in the database if it is determined that the vehicle in which the first vehicle monitoring device is connected is within a predefined proximity of the dealer location, and it is also determined that the first VIN and the first UIN transmitted from the vehicle monitoring device are both associated with one and the same lending entity identifier in the database.

6. The method of claim 2 further comprising removing the first UIN transmitted from the vehicle monitoring device from an inactive device account in the database if it is determined that the vehicle in which the first vehicle monitoring device is connected is within a predefined proximity of the dealer location, and it is also determined that the first VIN and the first UIN transmitted from the vehicle monitoring device are both associated with one and the same lending entity identifier in the database.

7. The method of claim 1 further comprising monitoring mileage of the vehicle in which the first vehicle monitoring device is connected and sending an exception message for the a lending entity whose lending entity identifier is associated with the first UIN transmitted from the vehicle monitoring device if it is determined that the vehicle has exceeded a predefined mileage limit.

8. The method of claim 1 further comprising monitoring speed of the vehicle in which the first vehicle monitoring device is connected and sending an exception message for the a lending entity whose lending entity identifier is associated with the first UIN transmitted from the vehicle monitoring device if it is determined that the vehicle has exceeded a predefined speed limit.

9. The method of claim 1 wherein further comprising the first vehicle monitoring device performs performing steps (d), (e), and (f) every time the first vehicle monitoring device determines that an ignition switch in the vehicle has been turned ON or OFF, and the central vehicle data server generates generating an ignition report upon receipt of a transmission from the first vehicle monitoring device which transmission indicates that the ignition switch in the vehicle has been turned ON or OFF.

10. The method of claim 1 wherein further comprising the first vehicle monitoring device performs performing steps (d), (e), and (f) at periodic time intervals, and the central vehicle data server generates generating a check-in report upon receipt of a transmission from the first vehicle monitoring device at a periodic time interval.

11. A method for keeping an inventory of vehicles that serve as collateral for loans provided by a lending entity, the method comprising:
  storing vehicle identification numbers (VINs) in a database in association with lending entity identifiers, wherein the VINs uniquely identify particular vehicles for which the lending entities have entity has provided financing, and wherein the lending entity identifiers uniquely identify identifies the lending entities entity that provided the loans for the vehicles;
  storing dealer location data in the database in association with each of the lending entity identifiers, wherein the dealer location data indicates a dealer location at which a dealer is to sell vehicles for which loans have been provided by at least one of the lending entities entity;
  storing unique identification numbers (UINs) in the database in association with the lending entity identifier for each lending entity, wherein the UINs uniquely identify particular vehicle monitoring devices assigned to each of the lending entities entity;
  connecting a first vehicle monitoring device to an on-board diagnostics connector in a vehicle, the first vehicle monitoring device having a first UIN that uniquely identifies the first vehicle monitoring device;
  the first vehicle monitoring device accessing vehicle data through the on-board diagnostics connector, which vehicle data indicates at least the a first VIN of the vehicle in which the first vehicle monitoring device is connected;
  the first vehicle monitoring device determining vehicle location data that indicate the location of the vehicle in which the first vehicle monitoring device is connected;
  the first vehicle monitoring device wirelessly transmitting at least the first VIN of the vehicle, the vehicle location data, and the first UIN of the vehicle monitoring device to a communication network;
  receiving the first VIN of the vehicle, the vehicle location data, and the first UIN of the vehicle monitoring device at a central vehicle data server that is connected to the communication network and is in communication with the database;
  determining whether the first VIN and the first UIN transmitted from the vehicle monitoring device are both associated with one and the same lending entity identifier in the database;
  determining based on the vehicle location data and the dealer location data whether the vehicle in which the first vehicle monitoring device is connected is within a predefined proximity of the dealer location; and
  when it is determined that the vehicle in which the first vehicle monitoring device is connected is within the predefined proximity of the dealer location, and that the first VIN and the first UIN transmitted from the vehicle monitoring device are both associated with one and the same lending entity identifier in the database,
  storing information associating in the database indicating that the first the UIN transmitted from the vehicle monitoring device having the first UIN is connected to the vehicle having the first VIN with the VIN transmitted from the vehicle monitoring device, and associating in the database the first UIN transmitted from the vehicle monitoring device with the dealer location.

12. A system for keeping an inventory of vehicles that serve as collateral for loans provided by a lending entity, the system comprising:

a database for storing vehicle identification numbers (VINs) and unique identification numbers (UINs) in association with a lending entity identifier, wherein the VINs uniquely identify particular vehicles for which the lending entity has provided financing, wherein the UINs uniquely identify particular vehicle monitoring devices assigned to the lending entity, and wherein the lending entity identifier uniquely identifies the lending entity that provided the loans for the vehicles;

a vehicle monitoring device configured to connect to an on-board diagnostics connector in a vehicle, the vehicle monitoring device comprising:

a processor for accessing vehicle data through the on-board diagnostics connector, wherein the vehicle data includes at least the VIN of the vehicle in which the vehicle monitoring device is connected;

a GPS receiver for determining vehicle location data indicating a location of the vehicle in which the vehicle monitoring device is connected;

a wireless modem for wirelessly transmitting at least the VIN of the vehicle, the vehicle location data, and the UIN of the vehicle monitoring device to a communication network; and memory for storing a UIN which uniquely identifies the vehicle monitoring device; and a central vehicle data server connected to the communication network and in communication with the database, the central vehicle data server for receiving the VIN of the vehicle, the vehicle location data, and the UIN of the vehicle monitoring device, and for determining whether the VIN and UIN transmitted from the vehicle monitoring device are both associated with one and the same lending entity identifier in the database, and if it is determined that the VIN and the UIN transmitted from the vehicle monitoring device are not both associated with one and the same lending entity identifier in the database, the central vehicle data server operable to send an exception message to one or both of the lending entity whose lending entity identifier is associated with the UIN transmitted from the vehicle monitoring device and the lending entity whose lending entity identifier is associated with the VIN transmitted from the vehicle monitoring device.

13. The system of claim 12 wherein:

the database stores dealer location data indicating a dealer location at which a dealer is to sell vehicles for which loans have been provided by the lending entity identified by the lending entity identifier; and the central vehicle data server determines based on the vehicle location data and the dealer location data whether the vehicle in which the vehicle monitoring device is connected is within a predefined proximity of the dealer location.

14. The system of claim 13 wherein the central vehicle data server sends an exception message to the lending entity whose lending entity identifier is associated with the UIN transmitted from the vehicle monitoring device if it is determined that the vehicle in which the vehicle monitoring device is connected is not within a predefined proximity of the dealer location.

15. The system of claim 13 wherein the database associates the UIN transmitted from the vehicle monitoring device with the VIN transmitted from the vehicle monitoring device if it is determined that the vehicle in which the vehicle monitoring device is connected is within a predefined proximity of the dealer location, and that the VIN and UIN transmitted from the vehicle monitoring device are both associated with one and the same lending entity identifier in the database.

16. The system of claim 13 wherein the database associates the UIN transmitted from the vehicle monitoring device with the dealer location if it is determined that the vehicle in which the vehicle monitoring device is connected is within a predefined proximity of the dealer location, and that the VIN and UIN transmitted from the vehicle monitoring device are both associated with one and the same lending entity identifier in the database.

17. A method for keeping an inventory of vehicles that serve as collateral for loans provided by a lending entity, the method comprising:

storing vehicle information in a database in association with a lending entity identifier that uniquely identifies the lending entity that provided the loans for the vehicles, wherein the vehicle information includes vehicle identification numbers (VINs) that uniquely identify particular vehicles for which the lending entity has provided financing, and wherein the vehicle information includes dealer location data indicating a dealer location at which a dealer is to sell vehicles for which loans have been provided by the lending entity identified by the lending entity identifier;

storing unique identification numbers (UINs) in the database in association with the lending entity identifier, wherein the unique identification numbers uniquely identify particular vehicle monitoring devices assigned to the lending entity;

connecting a vehicle monitoring device to an on-board diagnostics connector in a vehicle, the vehicle monitoring device having a UIN that uniquely identifies the vehicle monitoring device;

the vehicle monitoring device accessing vehicle data through the on-board diagnostics connector, which vehicle data indicates at least the VIN of the vehicle in which the vehicle monitoring device is connected;

the vehicle monitoring device determining vehicle location data indicative of a location of the vehicle;

the vehicle monitoring device wirelessly transmitting at least the VIN of the vehicle, the vehicle location data, and the UIN of the vehicle monitoring device to a communication network;

receiving the VIN of the vehicle, the vehicle location data, and the UIN of the vehicle monitoring device at a central vehicle data server that is connected to the communication network and is in communication with the database;

determining whether the VIN and UIN transmitted from the vehicle monitoring device are both associated with one and the same lending entity identifier in the database;

(i) determining based on the vehicle location data and the dealer location data whether the vehicle in which the vehicle monitoring device is connected is within a predefined proximity of the dealer location; and (j) upon determining that the vehicle in which the vehicle monitoring device is connected is within a predefined proximity of the dealer location, and that the VIN and the UIN transmitted from the vehicle monitoring device are both associated with one and the same lending entity identifier in the database, associating the UIN transmitted from the vehicle monitoring device with the VIN transmitted from the vehicle monitoring device in the database storing information in the database indicating that the vehicle monitoring device identified by the transmitted UIN is connected to the vehicle identified by the transmitted VIN.

* * * * *